United States Patent
Thongam et al.

(10) Patent No.: US 10,576,828 B2
(45) Date of Patent: Mar. 3, 2020

(54) VARIABLE VOLTAGE CONVERTER MODULATION OBTAINING LOWER MINIMUM BOOST RATIO

(71) Applicant: FORD GLOBAL TECHNOLOGIES, LLC, Dearborn, MI (US)

(72) Inventors: Jogendra S. Thongam, Troy, MI (US); Shuitao Yang, Dearborn Heights, MI (US); Mohammed Khorshed Alam, Dearborn, MI (US); Lihua Chen, Farmington Hills, MI (US); Fan Xu, Novi, MI (US); Yan Zhou, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 235 days.

(21) Appl. No.: 15/404,393

(22) Filed: Jan. 12, 2017

(65) Prior Publication Data
US 2018/0198401 A1    Jul. 12, 2018

(51) Int. Cl.
| | |
|---|---|
| *B60L 11/18* | (2006.01) |
| *B60L 7/14* | (2006.01) |
| *B60L 53/24* | (2019.01) |
| *H02M 3/158* | (2006.01) |

(52) U.S. Cl.
CPC ........... *B60L 7/14* (2013.01); *B60L 53/24* (2019.02); *H02M 3/158* (2013.01); *B60L 2210/10* (2013.01); *B60L 2210/30* (2013.01); *B60L 2210/40* (2013.01); *B60L 2220/42* (2013.01); *Y02T 10/642* (2013.01); *Y02T 10/7005* (2013.01)

(58) Field of Classification Search
CPC ........ H02P 27/08; B60L 7/14; B60L 11/1811; B60L 2210/10; B60R 16/03; B60R 16/0315; B60R 21/017; Y02T 10/7005; H02J 7/1438
USPC ....................................................... 307/10.1
See application file for complete search history.

(56) References Cited

U.S. PATENT DOCUMENTS

| | | | |
|---|---|---|---|
| 3,718,847 A | 2/1973 | Graf et al. | |
| 6,477,067 B1* | 11/2002 | Kerkman | H02M 7/5395 363/132 |
| 6,714,424 B2 | 3/2004 | Deng et al. | |
| 7,541,769 B2 | 6/2009 | Nawa et al. | |
| 7,715,217 B2 | 5/2010 | Manabe et al. | |

(Continued)

*Primary Examiner* — Thienvu V Tran
*Assistant Examiner* — Brian K Baxter
(74) *Attorney, Agent, or Firm* — David B. Kelley; MacMillan, Sobanski & Todd, LLC

(57) ABSTRACT

A variable voltage converter for an electric drive system has upper and lower switching devices in series between positive and negative buses. An inductance couples a junction between the switching devices to a DC battery. A controller is configured to drive the switches according to PWM gate signals based on an expected boost ratio of the converter. The PWM gate signals have a nominal dead-time insertion for both the upper and lower switching devices when the expected boost ratio is greater than a predetermined boost ratio. In order to extend a range of achievable boost ratios during regeneration operation, the PWM gate signals are without dead-time insertion for the upper switching device and the lower switching device remains continuously off when the expected boost ratio is less than the predetermined boost ratio.

15 Claims, 3 Drawing Sheets

(56) References Cited

U.S. PATENT DOCUMENTS

| | | |
|---|---|---|
| 8,088,224 B2 | 1/2012 | Vasquez et al. |
| 8,107,267 B2 | 1/2012 | Tallam et al. |
| 8,503,207 B2 | 8/2013 | Tallam et al. |
| 9,106,162 B2 | 8/2015 | Isayeva et al. |
| 2005/0174076 A1* | 8/2005 | Katanaya ............ H02M 7/53873 318/400.28 |
| 2009/0108794 A1* | 4/2009 | Ochiai .............. H02M 7/53875 318/760 |
| 2010/0045102 A1* | 2/2010 | Kitanaka ............. H02M 3/1582 307/9.1 |
| 2010/0244558 A1* | 9/2010 | Mitsutani ............... B60K 6/365 307/9.1 |
| 2010/0301788 A1* | 12/2010 | Chen .................. H02P 21/0003 318/400.3 |
| 2012/0019231 A1* | 1/2012 | Chen ..................... H02M 3/155 323/312 |
| 2012/0206076 A1* | 8/2012 | Tanaka .............. H02M 7/53873 318/400.28 |
| 2013/0088203 A1* | 4/2013 | Solie ....................... H02J 7/022 320/129 |
| 2013/0110334 A1* | 5/2013 | Asami ................. B60L 11/1803 701/22 |
| 2013/0187583 A1* | 7/2013 | Iwatsuki ................... H02P 6/10 318/400.17 |
| 2013/0278200 A1* | 10/2013 | Fujii ....................... H02P 21/06 318/722 |
| 2014/0132327 A1* | 5/2014 | Liao ....................... H03K 5/088 327/316 |
| 2015/0075898 A1 | 3/2015 | Suzuki |
| 2015/0210267 A1* | 7/2015 | Sato ...................... B60W 10/06 701/22 |
| 2016/0152150 A1* | 6/2016 | Taguchi ................... B60L 58/26 307/10.1 |
| 2016/0211772 A1* | 7/2016 | Degner ................... H02M 1/38 |
| 2016/0211773 A1* | 7/2016 | Degner ............ H02M 7/53871 |
| 2016/0211774 A1* | 7/2016 | Degner ............ H02M 7/53875 |
| 2016/0318404 A1* | 11/2016 | Kumazawa ............. B60L 50/50 |
| 2017/0005591 A1* | 1/2017 | Tamura ................... H02M 1/14 |
| 2017/0294862 A1* | 10/2017 | Takahashi ............... H02P 21/22 |
| 2018/0175774 A1* | 6/2018 | Nakayama ................ B60L 7/10 |

* cited by examiner

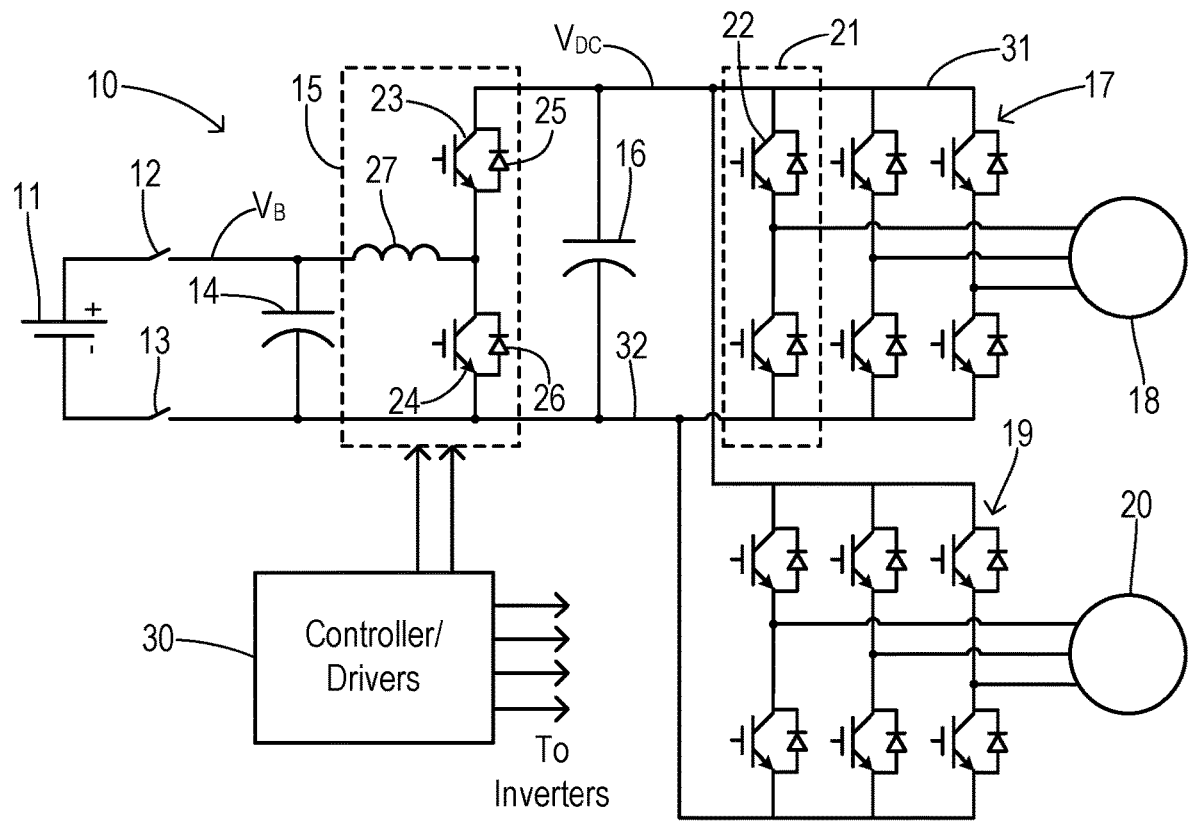
Fig. 1
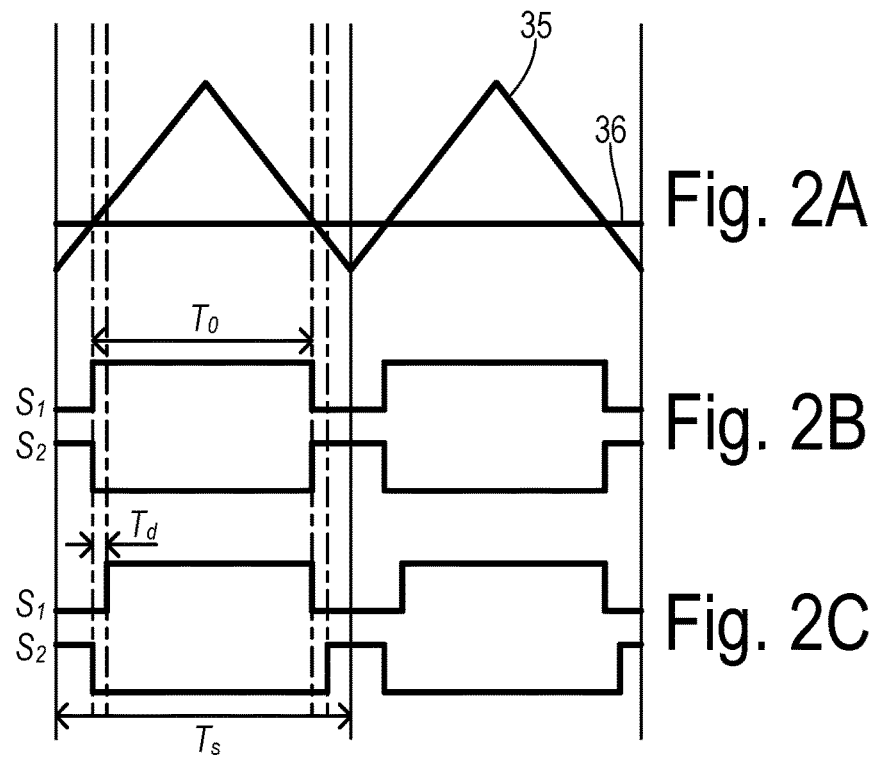
Fig. 2A
Fig. 2B
Fig. 2C

VARIABLE VOLTAGE CONVERTER MODULATION OBTAINING LOWER MINIMUM BOOST RATIO

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to variable voltage converters in electric drive systems for electrified vehicles, and more specifically to duty cycle modulation and use of selectable dead time insertion for power switching devices in a converter to achieve a greater range of boost ratios when operating in a boost mode.

Electric vehicles, such as hybrid electric vehicles (HEVs), plug-in hybrid electric vehicles (PHEVs), and battery electric vehicles (BEVs), use inverter-driven electric machines to provide traction torque. A typical electric drive system may include a DC power source (such as a battery pack or a fuel cell) coupled by contactor switches to a variable voltage converter (VVC) to regulate a main bus voltage across a main DC linking capacitor. A 3-phase motor inverter is connected between the main buses and a traction motor in order to convert the DC bus power to an AC voltage that is coupled to the windings of the motor to propel the vehicle. The motor is driven by the vehicle wheels and may be used to deliver electrical power to charge the battery during regenerative braking of the vehicle. Another 3-phase inverter connects a generator to the DC bus. The generator may be driven by an internal combustion engine to charge the battery. During charging, the VVC converts the main bus voltage to a voltage appropriate for charging the DC battery pack.

Using the appropriate modulation of the power switches, a VVC can boost a direct current voltage provided by the battery to a higher voltage to drive the motor at an improved level of vehicle performance. When used to boost a voltage from an input side to an output side, the converter is referred to as a boost converter. In the field of hybrid vehicles, it is common practice to charge a battery through regenerative braking, in which the mechanical energy of the wheels is converted to electrical energy by a generator, or by a motor operating as a generator, and provided to the battery via the VVC. The VVC can also operate in a pass-through mode in which transient current flows to/from the battery side from/to the inverter side, with no boost in voltage.

The VVC includes upper and lower transistor switching devices (e.g., insulated gate bipolar transistors, IGBTs) have an intermediate junction connected to the source battery via an inductor. The switching devices are connected in series between the positive and negative DC buses. An electronic controller provides switching signals (i.e., gate signals) to turn the switching devices on and off according to a modulation scheme that provides the desired VVC mode. Pulse width modulation is typically used to control the stepping up of a voltage by the VVC, wherein a duty cycle of the switching signals can be varied in order to regulate the VVC voltage to a desired magnitude. The "boost ratio" of the VVC is defined as the ratio of the output voltage to the input voltage. In pass-through mode, the boost ratio is one. Otherwise, the boost ratio is greater than one (i.e., the voltage on the inverter side of the VVC is higher than on the battery side of the VVC).

To avoid a short circuit across the DC link, it is important that the upper and lower devices not be conducting (i.e., turned-on) simultaneously. A short time interval (known as dead-time) is typically inserted at any transitions in the switching signals during which both the upper and lower switching devices are turned off in order to prevent such shoot-through. The insertion of dead time, however, changes the effective duty cycle of the PWM switching signals. During regeneration operation, for example, the dead time may increase the minimum achievable boost ratio significantly above the value of 1.0 (e.g., as much as 1.25 at a high PWM switching frequency around 20 kHz). The unavailability of a lower boost ratio may lead to a higher than desired voltage on the main DC bus or to a forced used of the pass-through mode which results in lower torque production by the motor due to a lower than desired voltage on the main DC bus.

SUMMARY OF THE INVENTION

In one aspect of the invention, a variable voltage converter in an electric drive system comprises an upper switching device connected in series with a lower switching device between a positive bus and a negative bus. An inductance couples a junction between the upper and lower switching devices to a DC power source. A controller is configured to drive the switches according to PWM gate signals based on an expected boost ratio of the converter. The PWM gate signals have a nominal dead-time insertion for both the upper and lower switching devices when the expected boost ratio is greater than a predetermined boost ratio. The PWM gate signals are without dead-time insertion for the upper switching device and the lower switching device remains continuously off when the expected boost ratio is less than the predetermined boost ratio.

BRIEF DESCRIPTION OF THE DRAWINGS

FIG. 1 is a schematic, block diagram showing an electric drive of a hybrid electric vehicle for practicing the invention.

FIGS. 2A, 2B, and 2C are waveform diagrams for a PWM carrier, PWM gate signals without dead time, and PWM gate signals with dead-time insertion, respectively.

DETAILED DESCRIPTION OF PREFERRED EMBODIMENTS

Figure 3:
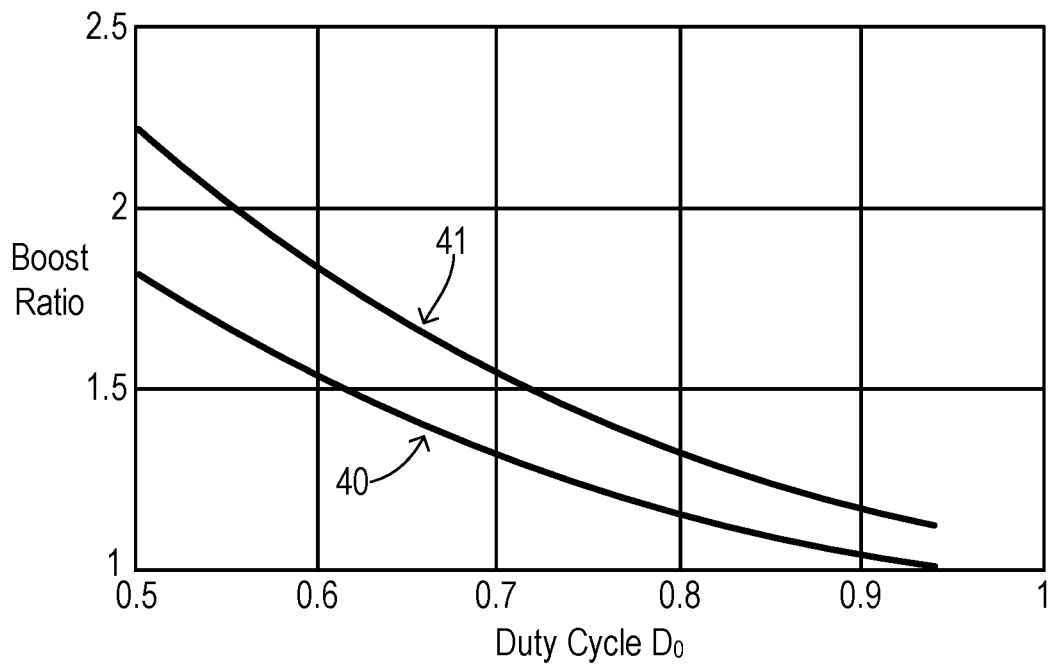
FIG. 3 is a graph showing boost ratios obtainable using conventional dead-time insertion.

Referring to FIG. 1, an electric vehicle drive system 10 includes a DC power source 11 (such as a battery pack or a fuel cell) coupled by contactor switches 12 and 13 to an input capacitor 14. Contactors 12 and 13 are preferably mechanical switches having an open state and a closed state for selectively coupling battery 11 to input capacitor 14 according to a driving mode of drive system 10.

A variable voltage converter (VVC) 15 couples input capacitor 14 to a main capacitor 16 which functions as a linking capacitor for inverters 17 and 19, for example. Each inverter includes a plurality of switching devices in a bridge configuration. The switches in inverter 17 are switched in a desired manner to drive a motor 18. Inverter 19 is switched to regenerate energy from a generator 20 onto main capacitor 16. In a motoring operation of VVC 15, electrical power flows from DC power source 11 through VVC 15 to inverter 17 (e.g., for vehicle propulsion). In a regeneration operation of VVC 15, electrical power flows from inverter 19 through VVC 15 to DC power source 11 (e.g., for recharging a battery pack using energy recovered during regenerative braking).

Each of the phase switching devices in inverters 17 and 19 are preferably comprised of an insulated-gate bipolar transistor (IGBT). Each IGBT preferably includes anti-parallel diode. A first leg 21 of inverter 17 is shown with a phase switch 22, for example. Each IGBT has a respective control (i.e., gate) terminal coupled to a controller 30 which controls the switches according to various operating modes of the inverters via a PWM signal as known in the art.

VVC 15 has a known configuration including an upper switching device 23, a lower switching device 24, and reverse diodes 25 and 26. Switches 23 and 24 are connected in series between a positive bus 31 and a negative bus 32. A junction between switches 24 and 25 is coupled to input capacitor 14 by an inductance 27. VVC 15 can bilaterally transfer charge between capacitors 14 and 16 as known in the art in either a motoring operation (e.g., converting the battery voltage $V_B$ on input capacitor 14 to a higher DC link voltage $V_{DC}$ across capacitor 16 for purposes of driving motor 18) or a regeneration operation (e.g., to convert a voltage from generator 20 and inverter 19 on capacitor 16 to a voltage across capacitor 14 for recharging battery 11).

Each of the switching devices in VVC 15 are likewise preferably comprised of an insulated-gate bipolar transistor (IGBT). Each IGBT has a respective control (e.g., base) terminal coupled to controller 30 which controls the switches according to various operating modes of the converter and inverters. Controller 30 may be comprised of a motor-generator control unit (MGCU) of a type that is commercially available and as described in U.S. Pat. No. 9,106,162, issued Aug. 11, 2015, which is incorporated herein by reference in its entirety.

In order to obtain a desired boost ratio across VVC 15, a well-known pulse width modulation (PWM) method is typically used to generate gate signals for IGBTs 23 and 24. A voltage boost ratio across VVC 15 (i.e., from battery voltage $V_B$ to the main DC-link voltage $V_{DC}$) is defined as $$\frac{V_{DC}}{V_B}.$$

Using the topology of VVC 15 shown in FIG. 1, the voltage boost ratio is determined by an on-time duty cycle D of upper switching device 23 as $$\frac{V_{DC}}{V_B} = \frac{1}{D}.$$

A pulse width modulation (PWM) method for inserting a nominal dead time $T_d$ is shown in FIGS. 2A-2C. FIG. 2A shows a PWM carrier signal 35 which is generated as a triangular waveform at a frequency of around 10 kHz, for example. A PWM modulation signal 36 is identified by the MGCU or other controller according to the power requirements (e.g., voltage boost demand) for the VVC in the current state of the electric drive unit. The conditions to be monitored and the controller process for determining an expected boost ratio to be delivered by the VVC are known in the art. Modulation signal 36 is compared with PWM carrier signal 35 to generate original PWM gate signals $S_1$ for the upper transistor and $S_2$ for the lower transistor shown in FIG. 2B prior to dead-time insertion. In this example, gate signal $S_1$ has a high logic level when carrier signal 35 is greater than duty-cycle signal 36 and gate signal $S_2$ is the inverse of $S_1$. $T_S$ is the carrier period (e.g., a period of 100 µS for a carrier frequency of 10 kHz), and $T_O$ is the ON time (i.e., high logic level portion) of the upper transistor during one carrier period. The ON time duty cycle $D_O$ prior to dead-time insertion is $$\frac{T_O}{T_S}.$$

As shown in FIG. 2C, a dead time $T_D$ is inserted at each transition of PWM gate signal $S_1$, such that whichever of the two signals $S_1$ and $S_2$ that has a high logic level is reset to a low (OFF) logic level. The duration of the dead time has a nominal value determined according to the characteristic switching times of the transistors being used. In a typical example, $T_D$ may have a duration of about 5 µS. Dead time $T_D$ typically remains constant during vehicle operation. The dead time avoids shoot-through that could occur if the upper and lower transistors were in an ON state or partially in an ON state at the same time. However, the inserted dead time also has an impact on the effective duty cycle of the VVC because the ON time of the upper transistor is changed.

The impact on the effective duty cycle is different depending on whether the VVC is in motoring operation or in regeneration operation. To include the effect of dead time on the effective duty cycle, the boost ratio of the VVC becomes:

$$\frac{V_{DC}}{V_B} = 1/(D_O + D_d) \text{ for motoring operation, and}$$

$$\frac{V_{DC}}{V_B} = 1/(D_O - D_d) \text{ for regeneration operation,}$$

where $D_O$ is the original duty cycle before inserting dead time (i.e., $D_O = T_O/T_s$), and $D_d$ is the duty cycle with inserted dead time (i.e., $D_d = T_d/T_s$). In order to guarantee a sufficient dead time, the design and configuration of a drive system with a VVC has ensured that $T_O$ is less than $T_s - T_d$. Likewise, the maximum effective duty cycle is not greater than $1 - D_d$. In the case of motoring operation, the minimum boost ratio achievable is one, because the value of $D_O + D_d$ approaches one. For regeneration operation, however, the minimum boost ratio using the conventional PWM switching pattern is greater than one (because $D_O - D_d$ is always less than one, meaning its reciprocal is always greater than one).

FIG. 3 shows the range of boost ratios for one example of a VVC. A curve 40 shows a range of boost ratios for motoring operation which reaches all the way down to one at the maximum duty cycle. Curve 41 shows a range of boost ratios for regeneration operation which is greater than one, even at the maximum duty cycle. For a VVC in the regeneration operation, a minimum possible boost ratio is given by $$G_{min} 1/(1-2D_d)$$

Using a PWM carrier frequency of 10 kHz (i.e., $T_s$=100 μS) and a nominal dead time $T_d$ of 5 μS, a minimum boost ratio of 1.11 is obtained. At higher carrier frequencies, the increase in the minimum obtainable boost ratio is even larger. For example, increasing the carrier frequency to 20 kHz raises the minimum boost ratio to 1.25. In the event that the VVC was operated in regeneration operation during a time when a target boost ratio (i.e., the ratio that would downconvert a high DC voltage from the generator to a preferred voltage for charging the battery) is not obtainable because it is less than $G_{min}$, an over-boost would result. Under these circumstances, it may be necessary to force the VVC into a passthrough mode (i.e., turning the upper transistor continuous ON and the lower transistor continuously OFF so that $V_B$ is equal to $V_{DC}$) to prevent the presence of unacceptably high voltages at the battery or other components or wiring associated with the input to the VVC. However, optimal charging would not be obtained and losses would be increased.

Figure 4:
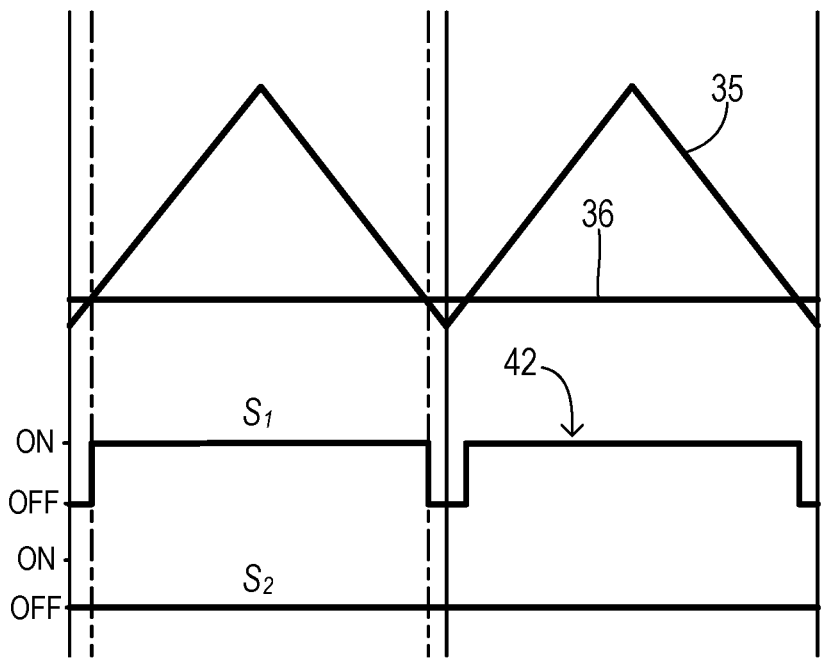
FIG. 4 is a waveform diagram showing a PWM gate signal pattern of the invention for achieving a greater range of boost ratios when in a regeneration mode of the variable voltage converter.

The present invention utilizes a modified PWM gate signal pattern 42 as shown in FIG. 4 during times when a desired boost ratio falling in a range from 1 to the minimum boost ratio $G_{min}$ would otherwise be unobtainable. In modified pattern 42, the PWM gate signals are without dead-time insertion for the upper switching device and the lower switching device remains continuously OFF. In essence, the lower switching device works the way it would in a passthrough mode (gate signal $S_2$ is a low logic level) while the upper switching device continues to work the way it does in boost mode (gate signal $S_1$ is determined by the comparison of carrier signal 35 with modulation signal 36). Since only a single device is switching ON, the dead time is no longer needed. Consequently, the duty cycle of the upper switching device is not modified by a dead time (i.e., the boost ratio in this case will be $1/D_O$. The resulting inductor current is substantially continuous, and it is robustly controlled to provide a desired charging voltage to the battery pack.

Figure 5:
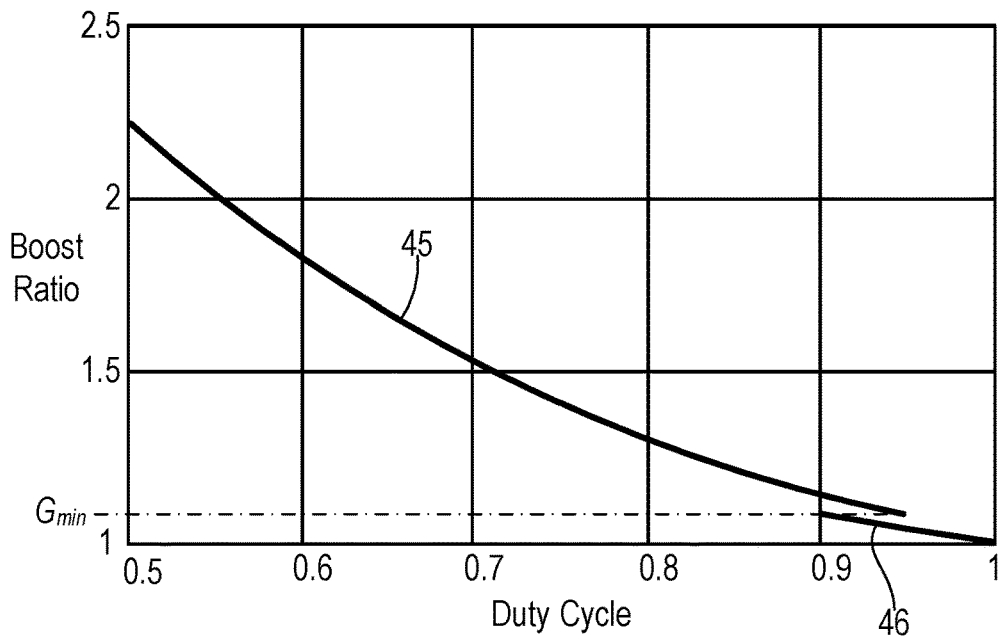
FIG. 5 is a graph showing the additional boost ratios obtainable with the present invention.

FIG. 5 shows the full range of boost ratio achieved by the present invention. A segment 45 shows the boost ratios obtained using PWM gate signals having dead time insertion for both the upper and lower transistors, wherein the range of available boost ratio extends from a maximum ratio (at the lowest duty cycle) to minimum ratio $G_{min}$. The range of boost ratios from $G_{min}$ down to 1 along a segment 46 are obtained using the modified PWM gate signal pattern with no dead-time insertion.

Figure 6:
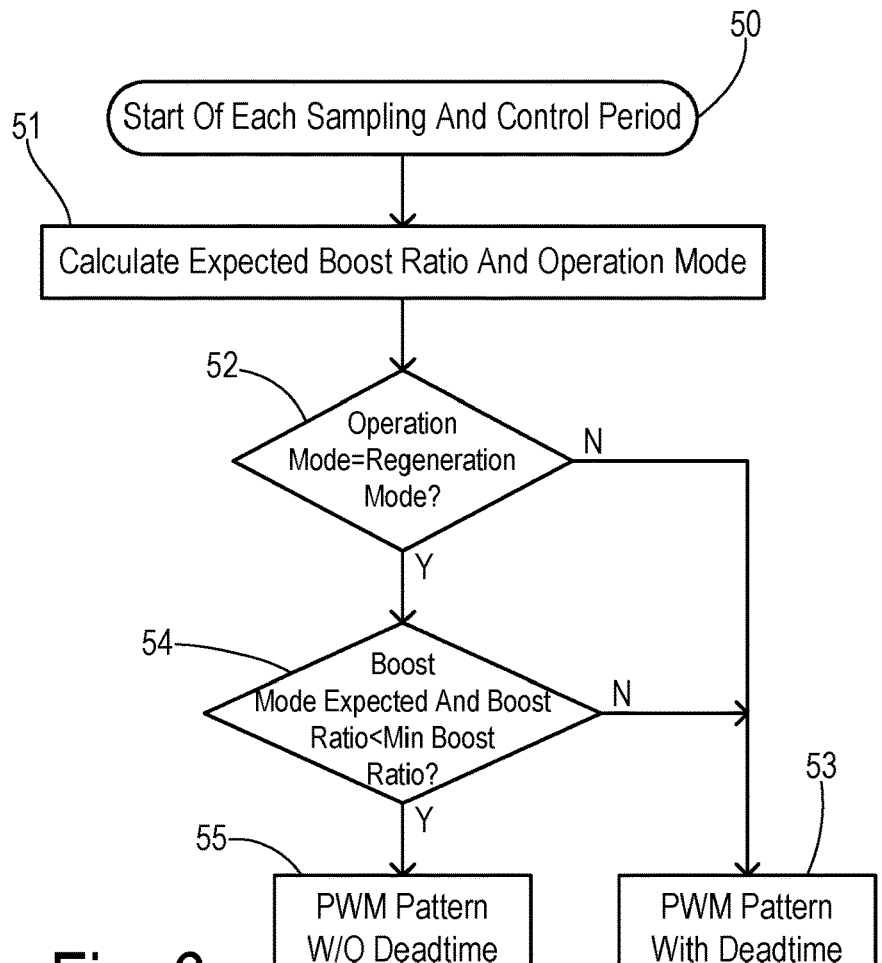
FIG. 6 is a flowchart showing one preferred method of the invention.

FIG. 6 shows one preferred method of the invention which operates to maintain an appropriate selection of the PWM gate signal pattern for use by the VVC according to the electric drive operating mode and the magnitude of the target boost ratio. The process is regularly invoked during vehicle operation in step 50 according to a predetermined sampling and control period. In step 51, the motor-generator control unit identifies the operation mode of the VVC and determines an expected boost ratio to be produced by the VVC in a known manner. In step 52, a determination is made whether the VVC is in a regeneration operation. If not, then the MGCU controls the switching of the VVC transistors using the PWM gate signal pattern with dead-time insertion in step 53. Otherwise, a check is performed in step 54 to determine whether the expected boost ratio is less than minimum boost ratio $G_{min}$. If not, then the MGCU controls the switching of the VVC transistors using the PWM gate signal pattern with dead-time insertion in step 53. Otherwise, the MGCU controls the switching of the VVC transistors using the PWM gate signal pattern without dead-time insertion in step 55.

The advantages of the present invention can be illustrated as follows. Assuming, for example, a typical maximum value for the main bus voltage $V_{DC}$ is specified as 500V and a minimum boost ratio with nominal dead time $G_{min}$ is 1.25, then regeneration operation of the VVC would only be available when the battery voltage is smaller than 400V (i.e., 500V/1.25). With any battery voltage higher than that, the regeneration operation is not available because it would cause over boost and the $V_D c$ output of the VVC would exceed the maximum value of 500V. In contrast, when use of the modified PWM gate signal pattern is combined with the conventional pattern then boost and passthrough modes are available as needed for all battery voltages up to 500V. In this way, the VVC can output a desired voltage in an extended battery voltage range, thereby providing higher torque capability for the inverter/motor.

What is claimed is:

1. A variable voltage converter in an electric drive system, comprising;
an upper switching device connected in series with a lower switching device between a positive bus and a negative bus, wherein a DC link voltage $V_{DC}$ is provided between the positive bus and negative bus which is adapted to be coupled to an inverter of the electric drive system;
an inductance for coupling a junction between the upper and lower switching devices to a DC power source wherein the DC power source provides a DC voltage $V_B$ less than DC link voltage $V_{DC}$; and
a controller configured to drive the upper and lower switching devices according to respective PWM gate signals adapted to provide an expected boost ratio of the variable voltage converter $$\frac{V_{DC}}{V_B},$$

wherein the PWM gate signals have a nominal dead-time insertion for both the upper and lower switching devices when the expected boost ratio is greater than a predetermined boost ratio, and wherein the PWM gate signals are without dead-time insertion for the upper switching device and the lower switching device remains continuously off when the expected boost ratio is greater than one and is less than the predetermined boost ratio.

2. The variable voltage converter of claim 1 wherein the variable voltage converter has a motoring operation in which electrical power flows from the DC power source through the variable voltage converter and has a regeneration operation in which electrical power flows from the variable voltage converter to the DC power source, and wherein the PWM gate signals without dead-time insertion for the upper switching device are used to drive the upper and lower switching devices only when in the regeneration operation.

3. The variable voltage converter of claim 1 wherein the respective PWM gate signals for the upper switching device have a variable duty cycle in response to the expected boost ratio.

4. The variable voltage converter of claim 1 wherein the predetermined boost ratio is a minimum dead-time boost ratio $G_{min}$ corresponding to:

$$G_{min} 1/(1-2D_d)$$

where $D_d$ is a duty cycle equivalent of the nominal dead time based on a carrier frequency of the PWM gate signals.

5. The variable voltage converter of claim 1 wherein the switching devices are comprised of respective insulated gate bipolar transistors, and wherein a respective reverse diode is connected in parallel with each respective transistor.

6. A method of controlling a variable voltage converter in an electric drive system, wherein the variable voltage converter includes an upper switching device connected in series with a lower switching device between a positive bus and a negative bus, wherein a DC link voltage $V_{DC}$ is provided between the positive bus and negative bus which is adapted to be coupled to an inverter of the electric drive system, wherein the variable voltage converter includes an inductance for coupling a junction between the upper and lower switching devices to a DC power source, and wherein the DC power source provides a DC voltage $V_B$ less than DC link voltage $V_{DC}$, the method comprising the steps of:

determining an expected boost ratio $$\frac{V_{DC}}{V_B}$$

to be produced by the variable voltage converter;

identifying whether the variable voltage converter is in a regeneration operation;

if the variable voltage converter is not in the regeneration operation then driving the upper and lower switching devices of the variable voltage converter using PWM gate signals having a nominal dead-time insertion for both the upper and lower switching devices;

if the variable voltage converter is in the regeneration operation and the expected boost ratio is greater than a predetermined boost ratio then driving the upper and lower switching devices using PWM gate signals having the nominal dead-time insertion for both the upper and lower switching devices; and if the variable voltage converter is in the regeneration operation and the expected boost ratio is greater than one and is less than the predetermined boost ratio then driving the upper switching device using PWM gate signals without dead-time insertion while maintaining the lower switching device continuously off.

7. The method of claim 6 wherein the predetermined boost ratio is a minimum dead-time boost ratio $G_{min}$ corresponding to:

$$G_{min} 1/(1-2D_d)$$

where $D_d$ is a duty cycle equivalent of the nominal dead time based on a carrier frequency of the PWM gate signals.

8. The method of claim 6 further comprising the step of varying a duty cycle of the respective PWM gate signals for the upper switching device in response to the expected boost ratio.

9. The method of claim 6 wherein the upper switching device is connected in series with the lower switching device between a positive bus and a negative bus and an inductance for coupling a junction between the upper and lower switching devices to the DC power source, and wherein the step of identifying whether the variable voltage converter is in a regeneration operation is comprised of detecting one of a motoring operation in which electrical power flows from the DC power source through the variable voltage converter or a regeneration operation in which electrical power flows from the variable voltage converter to the DC power source.

10. A variable voltage converter for an electric vehicle, comprising;

an upper transistor connected in series with a lower transistor, wherein a DC link voltage $V_{DC}$ is provided across the series-connected transistors;

an inductance for coupling the upper and lower transistors to a battery providing a DC voltage $V_B$ less than DC link voltage $V_{DC}$; and a controller driving the upper and lower transistors with PWM gate signals according to an expected boost ratio $$\frac{V_{DC}}{V_B},$$

the PWM gate signals including dead-time insertion when the expected boost ratio is above a threshold and lacking dead-time insertion when the expected boost ratio is below the threshold and is greater than one.

11. The variable voltage converter of claim 10 wherein the respective PWM gate signal for the lower transistor is continuously off when the expected boost ratio is below the threshold.

12. The variable voltage converter of claim 10 wherein the variable voltage converter has a motoring operation in which electrical power flows from the battery through the variable voltage converter and has a regeneration operation in which electrical power flows from the variable voltage converter to the battery, and wherein the PWM gate signals lacking dead-time insertion are used to drive the upper and lower transistors only when in the regeneration operation.

13. The variable voltage converter of claim 10 wherein the respective PWM gate signals for the upper transistor have a variable duty cycle in response to the expected boost ratio.

14. The variable voltage converter of claim 10 wherein the threshold is a minimum dead-time boost ratio $G_{min}$ corresponding to:

$$G_{min} 1/(1-2D_d)$$

where $D_i$ is a duty cycle equivalent of a nominal dead time based on a carrier frequency of the PWM gate signals.

15. The variable voltage converter of claim 10 wherein the upper and lower transistors are comprised of respective insulated gate bipolar transistors, and wherein a respective reverse diode is connected in parallel with each respective transistor.

* * * * *